United States Patent
Zhang et al.

(10) Patent No.: US 9,668,165 B2
(45) Date of Patent: May 30, 2017

(54) MEASURING COMMUNICATION QUALITY VIA A MOBILE COMMUNICATION NETWORK

(71) Applicant: SoftBank Corp., Tokyo (JP)

(72) Inventors: Liang Zhang, Tokyo (JP); Takao Okamawari, Tokyo (JP); Teruya Fujii, Tokyo (JP)

(73) Assignee: SOFTBANK CORP., Tokyo (JP)

(*) Notice: Subject to any disclaimer, the term of this patent is extended or adjusted under 35 U.S.C. 154(b) by 93 days.

(21) Appl. No.: 14/426,493

(22) PCT Filed: Apr. 2, 2014

(86) PCT No.: PCT/JP2014/059751
§ 371 (c)(1),
(2) Date: Mar. 6, 2015

(87) PCT Pub. No.: WO2015/151247
PCT Pub. Date: Oct. 8, 2015

(65) Prior Publication Data
US 2016/0262043 A1    Sep. 8, 2016

(51) Int. Cl.
*H04L 1/00*    (2006.01)
*H04W 28/02*    (2009.01)
(Continued)

(52) U.S. Cl.
CPC ..... *H04W 28/0236* (2013.01); *H04M 3/2236* (2013.01); *H04W 24/00* (2013.01); *H04W 28/0215* (2013.01); *H04W 28/0226* (2013.01)

(58) Field of Classification Search
CPC ........... H04W 28/0236; H04W 3/2236; H04W 28/0215; H04W 28/0226
See application file for complete search history.

(56) References Cited

U.S. PATENT DOCUMENTS 8,169,927 B2 * 5/2012 Matsunaga ........... H04W 28/08
370/252

8,626,151 B2 * 1/2014 Beppler ................ H04W 48/18
370/252
(Continued)

FOREIGN PATENT DOCUMENTS

JP    1999-261476    9/1999
JP    2003-204296 A    7/2003
(Continued)

OTHER PUBLICATIONS

International Telecommunication Union, ITU-T, Series P: Telephone Transmission Quality, Telephone Installations, Local Line Networks, "Methods for objective and subjective assessment of quality," p. 862, Feb. 2001.
(Continued)

*Primary Examiner* — Abdelnabi O Musa
(74) *Attorney, Agent, or Firm* — Muirhead and Saturnelli, LLC (57) ABSTRACT

Methods and systems of measuring communication quality are provided, by which various types of communication quality measurements can be flexibly performed as the measurement condition can be set or changed easily and optionally, while load of processing in the communication terminal apparatus can be suppressed. Measurement condition for measuring communication quality is delivered to a communication terminal apparatus capable of communicating via a mobile communication network and a communication with the communication terminal apparatus via the mobile communication network is performed at a predetermined timing that satisfies the measurement condition. Then, at least one of terminal-side measurement data including terminal-status log information and network-side measurement data including terminal-existing base-station quality information corresponding to communication corresponding to the predetermined timing which are recorded in the communication terminal apparatus is acquired, and an index value of communication quality in communication via the mobile communication network is
(Continued)

calculated based on at least one of the terminal-side measurement data and the network-side measurement data.

18 Claims, 5 Drawing Sheets (51) Int. Cl.
*H04W 24/00* (2009.01)
*H04M 3/22* (2006.01)

(56) References Cited

U.S. PATENT DOCUMENTS

2014/0273875 A1* 9/2014 Fudaba ................ H04W 24/08
455/67.13
2014/0315496 A1* 10/2014 Hamada ............... H04W 24/10
455/67.11

FOREIGN PATENT DOCUMENTS

| JP | 2006-20155 | 1/2006 |
| JP | 2006-020155 A | 1/2006 |
| JP | 2007-201944 A | 8/2007 |

OTHER PUBLICATIONS

International Telecommunication Union, ITU-T, Series P: Terminals and Subjective and Objective Assessment Methods, "Methods for objective and subjective assessment of speech quality," p. 863, Feb. 2011.

* cited by examiner

MEASURING COMMUNICATION QUALITY VIA A MOBILE COMMUNICATION NETWORK

TECHNICAL FIELD

The present invention relates to methods and systems of measuring quality of communication via a mobile communication network.

BACKGROUND ART

A communication quality measurement method with communication transmitting and receiving via a mobile communication network is conventionally known, in which measurement condition such as a predetermined given time and location of measurement is informed to a measurer in advance and the communication for measurements is conducted by the measurer with operating a mobile telephone (communication terminal apparatus) at the given location and time for measurements. In this method, based on communication logs constantly recorded in the mobile telephone operated by the measurer, measurement data when conducting the aforementioned communication transmitting and receiving are extracted and acquired, and an index value (e.g. a probability of connection) of communication quality is calculated from the acquired measurement data.

Patent Literature 1 described a speech quality confirmation apparatus for mobile telephones, which is consisted of a computer arithmetic device connected to a public line network, and a response device connected with a mobile telephone so as to perform data transmission and reception with the computer arithmetic device via a mobile telephone network. The computer arithmetic device and response device in the speech quality confirmation apparatus transmit and receive data each other via a mobile telephone network (mobile communication network) at a predetermined given time or location and record the data, in accordance with programmed procedures. Based on the recorded data, the computer arithmetic device confirms speech quality of the mobile telephone by analyzing non-responding status such as disconnection of a communication line to the response device, non-detection of a dial tone, detection of a busy tone, non-detection of a silent tone and so on, and differences of contents between the transmitted data and the received data.

CITATION LIST

Patent Literature

Patent Literature 1: Japanese Unexamined Patent Application Publication No. H11-261476.

Non-Patent Literature

Non-Patent Literature 1: "Perceptual evaluation of speech quality (PESQ): An objective method for end-to-end speech quality assessment of narrow-band telephone networks and speech codecs", SERIES P: TELEPHONE TRANSMISSION QUALITY, TELEPHONE INSTALLATIONS, LOCAL LINE NETWORKS, Methods for objective and subjective assessment of quality, TELECOMMUNICATION STANDARDIZATION SECTOR OF ITU, ITU-T Recommendation P.862 (02/2001).

Non-Patent Literature 2: "Perceptual objective listening quality assessment", SERIES P: TERMINALS AND SUBJECTIVE AND OBJECTIVE ASSESSMENT METHODS, Methods for objective and subjective assessment of speech quality, TELECOMMUNICATION STANDARDIZATION SECTOR OF ITU, ITU-T Recommendation P.863 (01/2011).

SUMMARY OF INVENTION

Technical Problem

In the foregoing conventional communication quality measurement method, however, the mobile telephone (communication terminal apparatus) operated by the measurer does not catch the time and location of performing the measurement of communication quality. Therefore, it is necessary to constantly record communication logs in the mobile telephone so as to afterward extract and acquire the measurement data when conducting the aforementioned transmitting and receiving communication, and the processing load in the mobile telephone becomes higher. Furthermore, it is necessary that the measurement condition such as a predetermined given time and location of the measurement is informed to the measurer in advance. Since the measurement condition informed in this way is unable to be set or changed easily and optionally, it is difficult to flexibly perform various types of communication quality measurements.

Moreover, there is the same problem in the foregoing speech quality confirmation apparatus described in Patent Literature 1. That is to say, a mobile telephone (communication terminal apparatus) connected to the response device in Patent Literature 1 does not catch the time and location of performing the data transmission and reception for the measurement of communication quality. Therefore, it is necessary to constantly record communication logs in the mobile telephone so as to afterward extract and acquire the measurement data when conducting the aforementioned the data transmission and reception, and the processing load in the mobile telephone becomes higher. Further, it is necessary that the measurement condition of transmitting and receiving data for the communication quality measurements is implemented in both of the aforementioned computer arithmetic device and response device in advance. Since the measurement condition implemented in this way is unable to be set or changed easily and optionally, it is difficult to flexibly perform various types of communication quality measurements.

Solution to Problem

A method of measuring communication quality according to an aspect of the present invention includes delivering information including measurement condition for measuring communication quality to a communication terminal apparatus capable of communicating via a mobile communication network, performing a communication with the communication terminal apparatus via the mobile communication network at a predetermined timing that satisfies the measurement condition, acquiring at least one of terminal-side measurement data including terminal-status log information corresponding to communication at the predetermined timing and network-side measurement data including network-side apparatus log information terminal-existing base-station quality information corresponding to communication at the predetermined timing, and calculating an index value of communication quality in communication via the mobile communication network based on at least one of the terminal-side measurement data and the network-side measurement data.

In the foregoing method, the index value of communication quality may be calculated with respect to bidirectional communications of an outgoing call from the communication terminal apparatus and an incoming call to the communication terminal apparatus.

In the foregoing method, the delivery of measurement condition, the communication via the mobile communication network, and the acquisition of at least one of the terminal-side measurement data and the network-side measurement data may be performed for a plurality of communication terminal apparatuses and the index value of communication quality may be calculated with respect to communications with the plurality of communication terminal apparatuses via the mobile communication network.

In the foregoing method, the measurement condition of communication quality may include at least one kind of information on a measurement schedule designating time of measuring the communication quality, a measurement area designating a place at which the communication terminal apparatus locates upon measuring the communication quality and a moving speed in measurement designating a moving speed of the communication terminal apparatus upon measuring the communication quality.

In the foregoing method, the information to be delivered may include a measurement contents designating a type of the index value of communication quality to be measured.

In the foregoing method, the index value of communication quality may be at least one of a probability of successful connection, a probability of failed connection, a probability of out-of-service, a probability of airplane mode, a probability of apparatus failures, a probability of power-off, a presence or absence of forcible disconnection, an evaluation value of voice quality and an error rate of communication terminal apparatuses in the mobile communication network.

In the foregoing method, the communication for measuring the communication quality may be a voice communication via the mobile communication network or a data communication via the mobile communication network.

A system of measuring communication quality according to another aspect of the present invention comprises means of delivering information including measurement condition for measuring communication quality to a communication terminal apparatus capable of communicating via a mobile communication network, means of performing a communication with the communication terminal apparatus via the mobile communication network at a predetermined timing that satisfies the measurement condition, means of acquiring at least one of terminal-side measurement data including terminal-status log information corresponding to communication at the predetermined timing and network-side measurement data including network-side apparatus log information corresponding to communication at the predetermined timing, and means of calculating an index value of communication quality in communication via the mobile communication network based on at least one of the terminal-side measurement data and the network-side measurement data.

In the foregoing system, the index value of communication quality may be calculated with respect to bidirectional communications of an outgoing call from the communication terminal apparatus and an incoming call to the communication terminal apparatus.

In the foregoing system, the delivery of measurement condition, the communication via the mobile communication network, and the acquisition of at least one of the terminal-side measurement data and the network-side measurement data may be performed for a plurality of communication terminal apparatuses and the index value of communication quality may be calculated with respect to communications with the plurality of communication terminal apparatuses via the mobile communication network.

In the foregoing system, the measurement condition of communication quality may include at least one kind of information on a measurement schedule designating time of measuring the communication quality, a measurement area designating place at which the communication terminal apparatus locates upon measuring the communication quality and a moving speed in measurement designating a moving speed of the communication terminal apparatus upon measuring the communication quality.

In the foregoing system, the information to be delivered may include a measurement contents designating a type of the index value of communication quality to be measured.

In the foregoing system, the index value of communication quality may be at least one of a probability of successful connection, a probability of failed connection, a probability of out-of-service, a probability of airplane mode, a probability of apparatus failures, a probability of power-off, a presence or absence of forcible disconnection, an evaluation value of voice quality and an error rate of communication terminal apparatuses in the mobile communication network.

In the foregoing system, the communication for measuring the communication quality may be a voice communication via the mobile communication network or a data communication via the mobile communication network.

In the foregoing system, the system includes a server of delivering information including the measurement condition to a communication terminal apparatus capable of communicating via a mobile communication network and a network-side apparatus of performing a communication with the communication terminal apparatus via the mobile communication network at a predetermined timing that satisfies the measurement condition are provided, wherein the server acquires at least one of the terminal-side measurement data and the network-side measurement data and calculates the index value of communication quality in a communication via the mobile communication network based on at least one of the terminal-side measurement data and the network-side measurement data.

Advantageous Effects of Invention

According to the present invention, while a load of processing in the communication terminal apparatus can be suppressed, the measurement condition can be set or changed easily and optionally so that various types of communication quality measurements can be flexibly performed with respect to a communication via a mobile communication network.

DESCRIPTION OF EMBODIMENTS

Hereinafter, embodiments of the present invention will be described with reference to the drawings.

It is noted that respective figures will only show schematically shape, dimension and positional relationship in a degree such that the present invention can be understood, and therefore, the present invention is not limited only to the shape, dimension and positional relationship illustrated in respective figures. Furthermore, numerical values exemplified in the description hereinafter are only preferred examples in the present invention, and therefore, the present invention is not limited to the numerical values exemplified.

Figure 1:
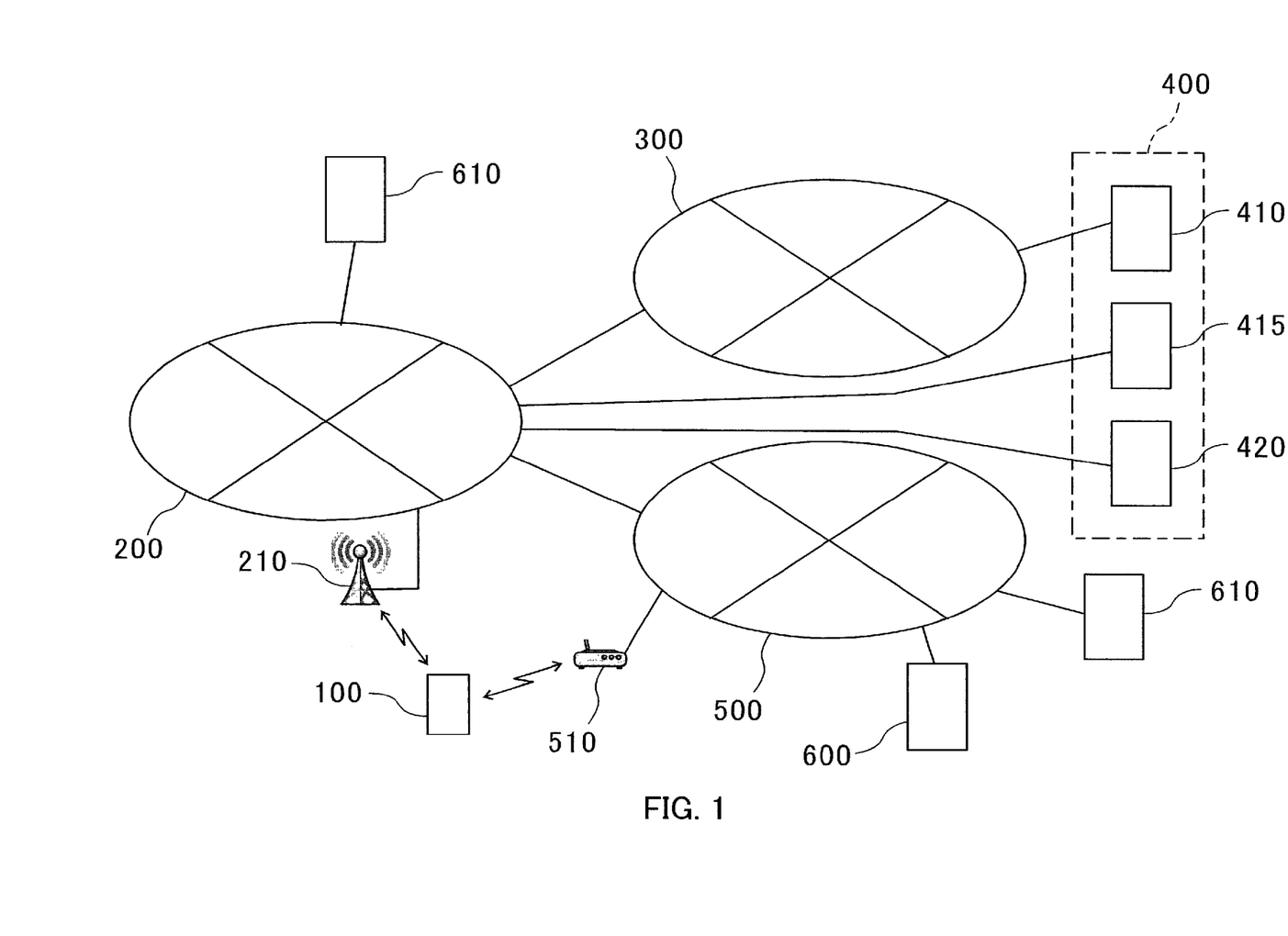
FIG. 1 is a schematic diagram showing one example of main part configuration of an overall communication system with a communication quality measurement system according to an embodiment of the present invention.

FIG. 1 is a schematic diagram showing one example of main part configuration of an overall communication system with a communication quality measurement system according to an embodiment of the present invention. In FIG. 1, the communication system of this embodiment includes a communication terminal apparatus 100 capable of being used by a user, and a communication quality measurement system 400 of performing a process relating to communication quality evaluation for a voice communication and/or a data communications via a mobile communication network (mobile telephone network) 200 by using the communication terminal apparatus 100. The communication quality measurement system 400 may be configured with a single server or a network apparatus, or may be configured by combining with a plurality of servers and/or network apparatuses.

The communication quality measurement system 400 exemplified in FIG. 1 is provided with an automatic voice response apparatus 410, a delivery and analysis server 420 being a first server and a data communication service providing server (hereinafter called as "data communication server") 415 being a second server. The automatic voice response apparatus 410 and data communication server 415 are network-side communication apparatuses (network apparatuses) which are capable of communicating with the communication terminal apparatus 100 and recording a predetermined network-side communication log.

The communication terminal apparatus 100 is capable of performing a voice communication with the automatic voice response apparatus 410 of communication quality measurement system 400 and/or other communication terminal apparatus via a circuit switched network of the mobile communication network 200 including a base station 210 or via the circuit switched network and a fixed-telephone network 300.

Furthermore, the communication terminal apparatus 100 is capable of receiving information delivery of measurement condition such as a measurement schedule, a measurement contents or the like from a delivery and analysis server 420 via the mobile communication network 200.

Moreover, the communication terminal apparatus 100 is capable of performing a voice communication by a VoIP (Voice over Internet Protocol), a VoLTE (Voice over LTE) or the like, performing a Web communication, a streaming or the like and/or performing various data communications, with the data communication server 415 and/or other communication terminal apparatus via a packet switching network of the mobile communication network 200 or via a packet switching network and the Internet 500.

Further, the communication terminal apparatus 100 is capable of accessing the Internet 500 via the foregoing mobile communication network 200 including the base station 210 or via a access-point apparatus 510 of a wireless LAN such as WiFi (Wireless Fidelity) and so on, and transceiving various data to and from the delivery and analysis server 420 and/or downloading contents such as music and so on from a contents providing server 600.

The communication terminal apparatus 100 is, for example, a tablet PC or a mobile communication terminal capable of performing a voice communication such as a mobile telephone, a smartphone, a PHS or the like, and capable of performing a voice communication and/or a data communication with a communication destination via the mobile communication network 200 that includes a base station being as a wireless relaying apparatus, switching equipment or the like.

For example, when existing in a cell being as a wireless communication area of the mobile communication network 200, the communication terminal apparatus 100 is capable of performing a voice communication with a communication terminal apparatus such as a tablet PC, a mobile communication terminal such as a mobile telephone, a smartphone, a PHS, etc. which exists in a cell of other mobile communication network.

Further, when exiting in a cell of the mobile communication network 200, the communication terminal apparatus 100 is capable of performing a voice communication with the automatic voice response apparatus 410 being as a voice communication destination of the communication quality measurement system 400 via the fixed-telephone network 300 and/or performing a data communication (including a VoIP or VoLTE call) with the data communication server 415 and/or the delivery and analysis server 420 of the communication quality measurement system 400 via the Internet 500.

In the description herein, the foregoing cell of the mobile communication network 200 is, for example, any one of various cells that are different in size between themselves, such as a macro cell, a micro cell, a femto cell, a pico cell or the like.

The communication terminal apparatus 100 is configured with, for example, a wireless signal processing section including an antenna, a transmitting amplifier, a receiving amplifier, a communication chip set, etc., a baseband signal processing section, an application execution management section, a voice input device including a small-size microphone, a voice output device including a speaker, a receiver, a vibration generator or the like, a display section such as an LCD being as display means, a main controller and so on. Furthermore, the communication terminal apparatus 100 includes a GPS receiving section that acquires information on its own current location by using the GPS (Global Positioning System), being as current location acquiring means. The communication terminal apparatus 100 may include an imaging section configured with a camera device such as a CCD, a CMOS device or the like, and an attitude detecting section configured with a gyro sensor, an acceleration sensor, a magnetic sensor or the like.

The main controller is configured with, for example, a microprocessor such as an MPU (Micro Processing Unit) and memories such as a RAM, a ROM etc., and controls respective sections based on a predetermined control program implemented in advance. For example, by executing the predetermined control program, the main controller is capable of performing a process of a voice communication with the automatic voice response apparatus 410 via the mobile communication network 200 and the fixed-telephone network 300 and a control of the voice communication, performing a process of extracting a received voice data of test voice signal based on the received signal from the automatic voice response apparatus 410 as a received voice data (digital signal) encoded by a predetermined compressing/coding scheme, performing a process of transmitting and receiving of various data to and from the server (delivery and analysis server 420, data communication server 415) via the mobile communication network 200 and the Internet 500 and a control of the transmitting and receiving, performing a download of contents such as music from the contents providing server 600 and a control of the download, performing a process of determining presence or absence of an abnormal disconnection, and so on.

The foregoing compressing/coding scheme for the received voice data includes, for example, GSM (registered trademark) (Global System for Mobile communications) AMR (Adaptive Multi-Rate) Codec/ACELP (Algebraic Code Excited Linear Prediction) compression (bit rate: 4.75 [kbps]-12.2 [kbps]). A file of the received voice data (digital) compressed and encoded in this way is capable of having a data amount of about one-tenth of a recorded audio file (e.g. WAV format file) obtained from the received voice data.

Moreover, the communication terminal apparatus 100 is capable of executing various application programs on a native environment of the main controller and/or executing various application programs on a virtual environment established by the application executing management section. In the description herein, the "application" (hereinafter abbreviated as "app" as appropriate) means a software capable of being applied to each of various uses such as a telephone, recording, browser, camera, search, mail, information delivery, calendar, clock, music playback, map display, data folder, message communication, video playback and so on, as well as a communication quality measurement processing, and is also called "application software". The "application" is an aggregation of files of executive programs developed with various computer languages and files of setting information, image, etc. that are used and/or referred when executing the program or in other timing.

The application execution management section manages, for example, program modules and libraries that are used for executing the applications. Moreover, the application execution management section establishes a framework (for example, an Android framework, an iOS framework, etc.) or a virtual execution environment (virtual machine) such as a Dalvik (registered trademark) VM, a Java VM, etc., which are used for any one, two or more than two of plural kinds of applications such as an Android (registered trademark) application, an iOS (registered trademark) application, a Windows (registered trademark) application, a Java (registered trademark) application and so on. The application execution management section is configured to have a multitasking function so as to execute a plurality of applications in parallel.

The delivery and analysis server 420 stores information on measurement condition such as a measurement schedule designating time of executing a communication quality measurement, etc. and/or information on measurement contents designating a type of index value of communication quality to be measured, and performs a management processing such as new registration, modification, deletion, etc. of the information on measurement condition and/or the measurement contents.

The delivery and analysis server 420 functions as a means of delivering information including the measurement condition and/or measurement contents of communication quality to the communication terminal apparatus 100 capable of communicating via the mobile communication network 200. Moreover, the delivery and analysis server 420 functions also as a means of delivering information including the measurement condition and/or measurement contents of communication quality to each of the automatic voice response apparatus 410 and the data communication server 415.

For example, the delivery and analysis server 420 is capable of delivering information on measurement condition such as the latest measurement schedule to the communication terminal apparatus 100 via the mobile communication network 200, at a predetermined timing that is set in advance or an arbitrary timing. In this case, the communication terminal apparatus 100 performs a communication with the automatic voice response apparatus 410 or the data communication server 415 via the mobile communication network 200, at the predetermined timing that satisfies the measurement condition received from the delivery and analysis server 420.

Furthermore, the delivery and analysis server 420 is capable of delivering information including measurement condition such as the latest measurement schedule to each of the automatic voice response apparatus 410 and the data communication server 415 via the mobile communication network 200 or a leased line that is not shown in figure, at a predetermined timing that is set in advance or an arbitrary timing. In this case, the automatic voice response apparatus 410 and the data communication server 415 perform a communication with the communication terminal apparatus 100 via the mobile communication network 200, at the predetermined timing that satisfies the measurement condition received from the delivery and analysis server 420.

The foregoing measurement condition may be other condition such as a measurement area designating a location of the communication terminal apparatus when performing a communication quality measurement, a moving speed in measurement designating a moving speed of the communication terminal apparatus when performing the communication quality measurement or the like, as well as the measurement schedule designating time for performing the communication quality measurement. Moreover, together with the foregoing measurement condition, a measurement contents designating a type of the index value of communication quality to be measured may be delivered. In this description herein, the index value of communication quality may be at least one of a probability of successful connection, a probability of failed connection, a probability of out-of-service, a probability of airplane mode, a probability of apparatus failures, a probability of power-off, a value showing presence or absence of forcible disconnection (Call Drop) during communication, a value of voice quality showing a evaluation result of voice quality (MOS value described below) and an error rate (block error rate, bit error rate, packet loss rate, etc.) during communication of communication terminal apparatuses in the mobile communication network.

The foregoing measurement condition and measurement contents may be set based on various kinds of information. For example, the measurement condition may be set based on at least one of a communication history of the communication terminal apparatus 100, a type/model of the communication terminal apparatus 100, a current location (GPS position, area, existing cell, etc.) of the communication terminal apparatus 100, a time zone (a weekday/holiday, day of week, early morning/daytime/nighttime), a moving speed (for example, low speed during moving on foot, high speed during moving by car, train or the like) of the communication terminal apparatus, information on a communications service provider of the mobile communication network 200 and communication quality (for example, receiving SINR) in the communication terminal apparatus 100. The system may be configured so as to have an automatic learning function capable of being updated by successively learning the measurement condition set in this way described above, and the measurement condition used in the immediately previous measurement may be preferentially delivered as the measurement condition used in the next measurement of communication quality.

The automatic voice response apparatus 410 is configured to be capable of communicating with the communication terminal apparatus 100 via the switching network of the mobile communication network 200 and the fixed-telephone network 300. Further, the automatic voice response apparatus 410 is configured to be capable of communicating with the delivery and analysis server 420 via the mobile communication network 200 or the leased line that is not shown in figure.

The automatic voice response apparatus 410 functions as a means of performing a voice communication with the communication terminal apparatus 100 via the mobile communication network 200 at the predetermined timing that satisfies the above-described measurement condition.

For example, the automatic voice response apparatus 410 performs an automatic voice response of transmitting a test signal for measurements of voice communication (for evaluation of voice communication) to the communication terminal apparatus 100, in response to an outgoing call of normal voice communication from the communication terminal apparatus 100 which is transmitted at a predetermined timing that satisfies the foregoing measurement condition.

The automatic voice response apparatus 410 may perform an automatic outgoing call of normal voice communication to the communication terminal apparatus 100 at the predetermined timing that satisfies the foregoing measurement condition and transmit a test signal for measurements of voice communication (for evaluation of voice communication) to the communication terminal apparatus 100 that responds to the automatic outgoing call.

The data communication server 415 is configured to be capable of communicating with the communication terminal apparatus 100 via the packet switching network of the mobile communication network 200, or via the packet switching network and the Internet 500. Furthermore, the data communication server 415 is configured to be capable of communicating with the delivery and analysis server 420 via the mobile communication network 200 or the leased line that is not shown in figure.

The data communication server 415 functions as a means of performing a data communication with the communication terminal apparatus 100 via the mobile communication network 200 at the predetermined timing that satisfies the foregoing measurement condition.

For example, the data communication server 415 performs an automatic voice response of transmitting a test signal for measurements of voice communication (for evaluation of voice communication) to the communication terminal apparatus 100, in response to an outgoing call of voice communication by VoIP, VoLTE, etc. from the communication terminal apparatus 100 transmitting at the foregoing predetermined timing. Moreover, the data communication server 415 also transmits a test data for measurements of communication quality in response to an acquisition request for the test data transmitted from the communication terminal apparatus 100 at the foregoing predetermined timing.

It is noted that the data communication server 415 may transmit the test signal for measurements of voice communication (for evaluation of voice communication) by VoIP, VoLTE, etc. or the test data for measurements of communication quality to the communication terminal apparatus 100 at a predetermined timing that satisfies the foregoing measurement condition, by a push-type communication to the communication terminal apparatus 100.

Moreover, the communication terminal apparatus 100, automatic voice response apparatus 410 and data communication server 415 are in a state of mutual time synchronization. For example, each of the communication terminal apparatus 100, automatic voice response apparatus 410 and data communication server 415 is capable of performing a time synchronization processing by communicating with an NTP (Network Time Protocol) server 610 connected to the mobile communication network 200 or the Internet 500. The time synchronization processing in each of the apparatuses and servers may be performed by receiving GPS signals or by other methods.

The delivery and analysis server 420 is configured to be capable of communicating with the communication terminal apparatus 100 via the packet switching network of the mobile communication network 200, or via the packet switching network and the Internet 500. Further, the delivery and analysis server 420 is also configured to be capable of communicating with the automatic voice response apparatus 410 and the data communication server 415 via the mobile communication network 200 or the leased line that is not shown in figure.

The delivery and analysis server 420 is capable of performing various processes relating to the evaluation of communication quality in a communication via the mobile communication network 200. For example, the delivery and analysis server 420 functions as a means of acquiring at least one of a terminal-side measurement data including terminal-status log information at the predetermined timing that satisfies the foregoing measurement condition recorded in the communication terminal apparatus 100 and a network-side measurement data including terminal-existing base-station quality information corresponding to a communication at the predetermined timing. Moreover, the delivery and analysis server 420 functions as a means of calculating an index value of communication quality in a communication via the mobile communication network 200, based on at least one of the terminal-side measurement data and the network-side measurement data.

Table 1 is a list showing one example of the terminal-side measurement data capable of being obtained from the communication terminal apparatus 100.

TABLE 1

| Category | Item | Contents |
| --- | --- | --- |
| Measurement schedule | Measurement time<br>Measurement location<br>Schedule ID | Starting time, Ending time<br>Latitude, Longitude<br>Schedule management number |
| Terminal information | Terminal identification number (IMEI)<br>Type/model of terminal<br>Operating system (OS)<br>Carrier information<br>Telephone number<br>Moving speed | |
| Measurement contents | Voice communication quality | Connection probability of voice communication,<br>Voice quality |
| | Data communication quality | Connection probability of data communication,<br>Communication speed |
| | Measurement direction | Outgoing from terminal,<br>Incoming to terminal |
| Measurement result | Result of voice communication quality | Voice quality value,<br>Recorded audio file,<br>Connection history of voice communication |
| | Result of data communication quality | Connection history of data communication,<br>Throughput value |
| Terminal-status log information | (Refer to Table 2) | |
| Terminal-existing base-station quality information | (Refer to Table 3) | |

In the description herein, the "recorded audio file" in Table 1 is a file created by recording a test voice signal including a test signal received from the automatic voice response apparatus 410 or the data communication server 415. The "voice quality value" in Table 1 is an evaluation value of voice quality such as a MOS (Mean Opinion Scores) value or the like calculated based on the recorded audio file and a sound source file of the test voice signal (refer to Non-Patent Literatures 1 and 2). In Table 1, the "connection probability of voice communication" is a value of successful connection count of voice communications divided by total connection count of performing voice communications, and the "connection probability of data communication" is a value of successful connection count of data communications divided by total connection count of performing data communications.

Table 2 is a list showing one example of the terminal-status log information in Table 1 included in the terminal-side measurement data. The terminal-status log information is recorded only in a predetermined time (for example, within two minutes) that includes time of the foregoing measurement schedule.

TABLE 2

| Item |
| --- |
| Call history |
| Setting of call waiting |
| Busy state |
| Setting of airplane mode |
| Setting of incoming rejection |
| Power-off |
| Out-of-service |
| Terminal freeze information |

Table 3 is a list showing one example of the terminal-existing base-station quality information in Table 1, which is included in the terminal-side measurement data. This terminal-existing base-station quality information is information relating to the terminal-existing base station in a cell (serving cell) within which the communication terminal apparatus 100 exists when conducting the measurements, and is recorded only during a predetermined time (for example, time within two minutes) including the foregoing time of measurement schedule.

TABLE 3

| Category | Item |
| --- | --- |
| Basic information | Physical cell ID (PCI)<br>Cell ID (CI)<br>Tracking area code (TAC)<br>Type of connection network<br>Center frequency<br>Frequency band |
| Radio channel quality information | Received signal strength indicator (RSSI)<br>Reference signal received power (RSRP)<br>Received signal code power (RSCP)<br>Reference signal received quality (RSRQ)<br>Energy per chip to noise radio (Ec/No)<br>Block error rate (BLER)<br>Channel quality indicator (CQI) |

Table 4 is a list showing one example of the network-side measurement data capable of being obtained from the automatic voice response apparatus 410 and the data communication server 415.

TABLE 4

| Category | Item | Contents |
| --- | --- | --- |
| Measurement schedule | Measurement time<br>Schedule ID | Starting time, Ending time<br>Schedule management number |
| Network-side apparatus | Automatic voice response apparatus<br>Server | Telephone number<br><br>IP address,<br>server management number |
| Measurement contents | Voice communication quality | Connection probability of voice communication,<br>Voice quality |
| | Data communication quality | Connection probability of data communication,<br>Communication speed |
| | Measurement direction | Outgoing from terminal,<br>Incoming to terminal |
| Network-side apparatus log information | (Refer to Table 5) | |

Table 5 is a list of one example showing the network-side apparatus log information in Table 4, which is included in the network-side measurement data. This network-side apparatus log information is recorded only during a predetermined time (for example, time within two minutes) including the foregoing time of measurement schedule.

TABLE 5

| Item |
| --- |
| Successful termination |
| Line busy |
| Forcible disconnection |
| Disconnection by destination |
| No-response from destination |
| Apparatus error signal |
| Line error |

Table 6 is a list showing one example of the index values of communication quality calculated by the delivery and analysis server 420. In the present embodiment herein, at least one of these index values of communication quality is calculated.

TABLE 6

| Index of communication quality | Definition |
| --- | --- |
| (Total) probability of connection | Successful connection count/Total measurement count |
| (Total) probability of failed connection | Failed connection count/Total measurement count |
| Failure probability of connection (caused by network-side) | Failed connection count caused by network-side/(Successful connection count + Failed connection count caused by network-side) |
| Probability of out-of-service | Count of out-of-service of terminal/Total measurement count |
| Probability of airplane mode | Count of airplane mode of terminal/Total measurement count |
| Probability of apparatus failures | Count of apparatus failure/Total measurement count |
| Probability of power-off | Count of power-off/Total measurement count |
| Presence or absence of forcible disconnection | Value indicating presence or absence of forcible disconnection (Call Drop) during communication |
| Voice quality value | MOS value indicating evaluation result of voice quality |
| Error rate | Error rate during communication (block error rate, bit error rate, packet loss rate, etc.) |

The foregoing index values of communication quality may be calculated with respect to a communication in any one direction of outgoing from the communication terminal apparatus 100 and incoming to the communication terminal apparatus 100, or may be calculated with respect to communications in both directions of outgoing from the communication terminal apparatus 100 and incoming to the communication terminal apparatus 100. The delivery of measurement condition, the communication via mobile communication network 200, and the acquisition of at least one of the terminal-side measurement data and network-side measurement data, which are described above, may be performed with respect to a plurality of communication terminal apparatuses 100, and the index value of communication quality may be calculated with respect to communications with the plurality of communication terminal apparatuses 100 via mobile communication network 200.

For example, each of the above-mentioned automatic voice response apparatus 410, data communication server 415 and delivery and analysis server 420 is configured by using hardwares such as a computer apparatus having an MPU, memories, etc., an external communication interface apparatus, a decoder being as necessary decoding means, and may be capable of performing various processes for communication quality evaluation by executing a predetermined program. When receiving from the communication terminal apparatus 100 a file of received voice data (digital signal) encoded by a predetermined coding scheme, the foregoing decoder can decode the received voice data using a predetermined decoding algorithm and generate a received voice signal (analog signal) that is a test voice signal received from the communication terminal apparatus 100.

It is noted herein that the foregoing delivery and analysis server 420 may be configured with a plurality of servers. For example, a delivery server of delivering the foregoing information including measurement condition and measurement contents and an analysis server of performing various processes relating to the evaluation of communication quality may be provided separately.

An example of communication quality measurements in the communication system according to the present embodiment will be then described.

Figure 2:
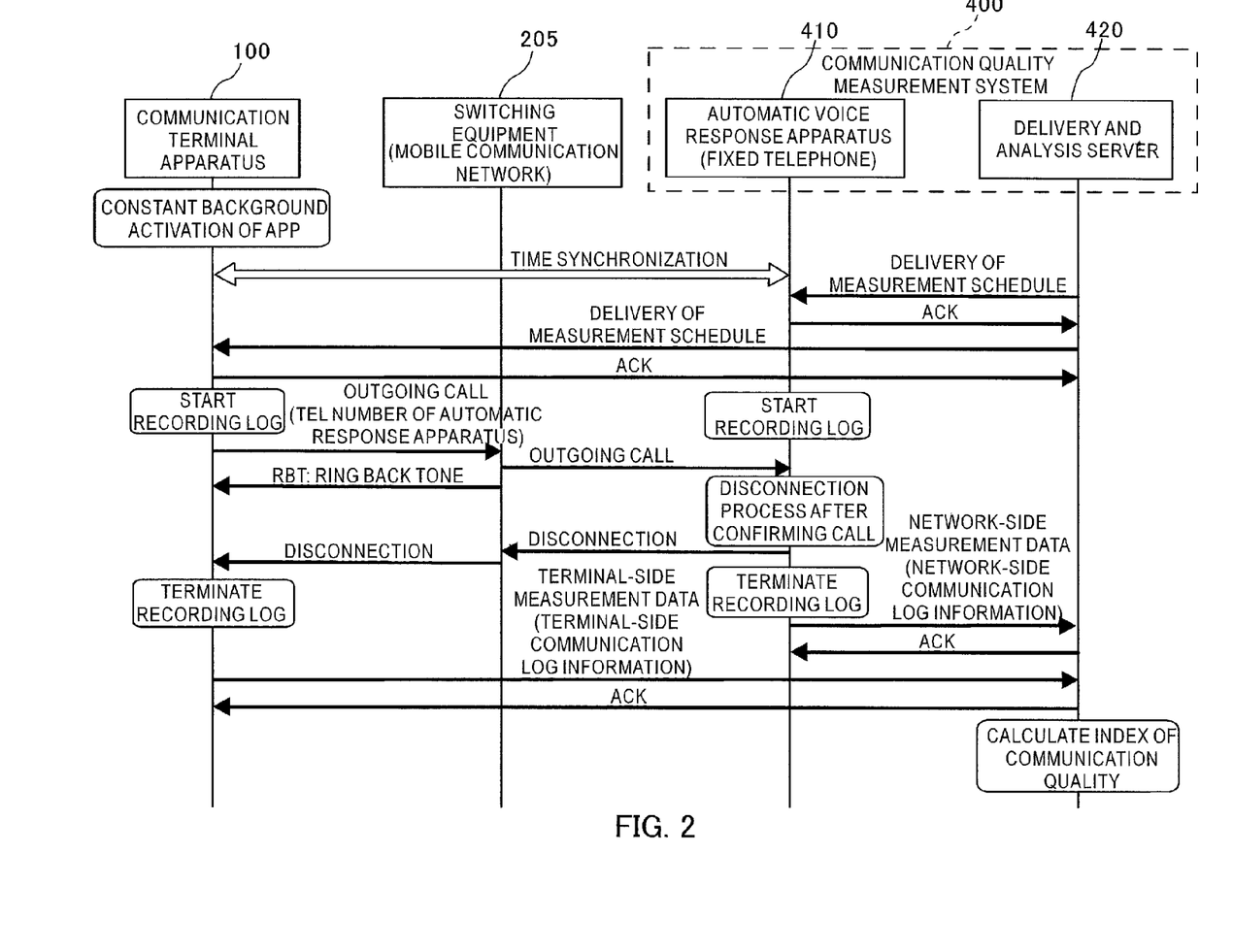
FIG. 2 is a sequence diagram showing one example of communication quality measurements for a voice communication in the direction of outgoing from a communication terminal apparatus in the communication system according to the present embodiment.

FIG. 2 is a sequence diagram showing one example of communication quality measurements for a voice communication in the direction of outgoing from a communication terminal apparatus 100 in the communication system according to the present embodiment. The present example is an example in which information including a measurement schedule that designates time for performing a communication quality measurement is delivered as measurement condition of the communication quality measurement.

In the example herein, a communication quality measurement app for performing a process of communication quality measurement is preinstalled in the communication terminal apparatus 100. The communication terminal apparatus 100 and automatic voice response apparatus 410 are mutually synchronized in time by using an NTP server, GPS signals, etc. which are not shown. Further, The communication terminal apparatus 100 is in a state of constant background operation with the communication quality measurement app activated in advance.

In FIG. 2, to begin with, the delivery and analysis server 420 transmits information of a predetermined measurement schedule as measurement condition designating a timing of communication quality measurement, to the communication terminal apparatus 100 and automatic voice response apparatus 410.

Table 7 shows one example of the information of measurement schedule transmitted from the delivery and analysis server 420. In the present example, 10:00 on Nov. 11, 2014 is designated as measurement time. This information of measurement schedule includes a schedule ID (schedule management number) for identifying and managing respective measurement schedule, and information of telephone number and type of the both of origination and destination for communication to measure a communication quality. As an option of measurement schedule, for example, information for designating an area in which a communication quality measurement is performed may be included. In this case, when the communication terminal apparatus 100 exists within the designated area, the communication quality measurement is performed at the timing when the designated measurement time comes.

TABLE 7

| Measurement time | Schedule ID | Origination | | Destination | | Option |
| --- | --- | --- | --- | --- | --- | --- |
| | | Telephone number | Type | Telephone number | Type | |
| 2014/11/11 10:00:00 | 1 | 080*** | Mobile | 0120*** | Fixed | Area name |

The communication terminal apparatus 100 starts recording a communication log for measuring a predetermined communication quality when the timing reached near the designated measurement time (10:00 on Nov. 11, 2014) comes, based on the information of measurement schedule received from the delivery and analysis server 420.

The automatic voice response apparatus 410 starts recording a communication log for measuring a predetermined communication quality when it comes to the timing reached near the measurement time (10:00 on Nov. 11, 2014) designated with the measurement schedule received from the delivery and analysis server 420. In the automatic voice response apparatus 410, the recording of communication log for communication quality measurement may be performed constantly.

The communication terminal apparatus 100 performs an automatic outgoing call for calling to the telephone number (0120********) of automatic voice response apparatus 410 designated as a destination on the aforementioned measurement schedule via switching equipment 205 of the mobile communication network 200 and the fixed-telephone network 300, when the foregoing predetermined measurement time (10:00 on Nov. 11, 2014) comes. When receiving the outgoing call from the communication terminal apparatus 100, the switching equipment 205 transmits a response of ringback tone to the communication terminal apparatus 100 and performs an outgoing call to the automatic voice response apparatus 410 via the fixed-telephone network 300 and mobile communication network 200. The telephone number of automatic voice response apparatus 410 may be preset in the communication quality measurement app.

When receiving the outgoing call from the switching equipment 205, the automatic voice response apparatus 410 performs an automatic disconnecting process after confirming the incoming call, transmits a disconnection signal to the communication terminal apparatus 100 via the switching equipment 205, and then, terminates recording the communication log. The network-side measurement data including the terminal-existing base-station quality information recorded with the automatic voice response apparatus 410 is transmitted to the delivery and analysis server 420.

When receiving the disconnection signal from the switching equipment 205, the communication terminal apparatus 100 terminates recording the communication log. The terminal-side measurement data including the terminal-status log information recorded with the communication terminal apparatus 100 is transmitted to the delivery and analysis server 420. The disconnecting process of voice communication may be performed with the communication terminal apparatus 100, separating from the automatic voice response apparatus 410.

Table 8 shows one example of the terminal-side measurement data transmitted from the communication terminal apparatus 100 to the delivery and analysis server 420. In the present example, the terminal-side measurement data includes, in addition to a schedule ID, an outgoing time (10:00 on Nov. 11, 2014), a current location of the communication terminal apparatus 100, a moving speed, a telephone number of origination (self), a telephone number of destination, information on success or failure of connection and other information. Further, in the present example, as other information, a terminal-existing base station information of the communication terminal apparatus 100, etc. is included. It is noted that the terminal-side measurement data is not limited to the example in Table 8 and may include one part or all of the various data indicated in the foregoing Tables 1 to 3.

On the other hand, the automatic voice response apparatus 410 terminates recording the communication log after the automatic disconnecting process is performed by the communication terminal apparatus 100. This network-side measurement data including the terminal-existing base-station quality information recorded with the automatic voice response apparatus 410 is transmitted to the delivery and analysis server 420.

Table 9 shows one example of the network-side measurement data transmitted from the automatic voice response apparatus 410 to the delivery and analysis server 420. In the present example, the network-side measurement data includes, in addition to a schedule ID, an incoming time (10:03 on Nov. 11, 2014), a telephone number of origination, a telephone number of destination (self), information on success or failure of connection and other information. Further, in the present example, as the other information, a signaling (PSTN/SS7 signal), etc. is included. It is noted that the network-side measurement data is not limited to the example in Table 9 and may include one part or all of the various data indicated in the foregoing Tables 4 and 5.

TABLE 9

| Schedule ID | Incoming time | Origination | Destination (self) | Success or failure of connection | Others |
|---|---|---|---|---|---|
| 1 | 2014/11/11 10:00:03 | 080*** | 0120*** | Success | PSTN/SS7 signal (signaling information) |

The delivery and analysis server 420 performs a process of communication quality analysis when receiving the terminal-side measurement data from the communication terminal apparatus 100 and the network-side measurement data from the automatic voice response apparatus 410. In this communication quality analysis, for example, the terminal-side measurement data and the network-side measurement data having a same schedule ID (schedule management number) are collated, and an index of communication quality in the communication of outgoing call for communication quality measurement from the communication terminal apparatus is calculated. As the index value of communication quality calculated herein, for example, at least one of a probability of connection, a total probability of failed connection, a failure probability of connection (caused by network-side), a probability of out-of-service, a probability of airplane mode, a probability of apparatus failures, a probability of power-off, a value indicating presence or absence of forcible disconnection (Call Drop), a voice quality value (MOS value) indicating an evaluation result of voice quality and an error rate during communication (block error rate, bit error rate, packet loss rate, etc.) for voice communication, which are listed in the foregoing Table 6, may be exemplified.

TABLE 8

| Schedule ID | Outgoing time | Existing location | Moving speed | Origination (self) | Destination | Success or failure of connection | Others |
|---|---|---|---|---|---|---|---|
| 1 | 2014/11/11 10:00:00 | Longitude/ Latitude (GPS) | 30 km/h | 080*** | 0120*** | Success | Terminal-existing base station information, etc. |

As described above, according to the example in FIG. 2, the measurement schedule is delivered from the delivery and analysis server 420 to the communication terminal apparatus 100 and the automatic voice response apparatus 410, as the measurement condition of communication quality measurement for a voice communication transmitted from the communication terminal apparatus 100. Consequently, with respect to the voice communication transmitted from the communication terminal apparatus 100, the measurement schedule of communication quality measurement can be set or changed easily and optionally, and then, while various communication quality measurements can be performed flexibly, the communication quality can be measured with high accuracy. For example, a cause of communication failure can be identified by collating the terminal-status log information with the terminal-existing base-station quality information. Further, by designating the information of measurement condition, a concentration of communication quality data for a specific location can be prevented and communication quality data can be obtained under the condition (during a high speed moving, in the location with weak electromagnetic waves, etc.) by which a mobile communications service provider can obtain the expected data.

Furthermore, according to the example in FIG. 2, it is enough for the communication terminal apparatus 100 to perform a process of recording communication log information during performing a communication for measuring communication quality in accordance with the measurement schedule received from the delivery and analysis server 420. Consequently, load of processing in the communication terminal apparatus 100 can be suppressed compared to a case of constantly recording communication log information in the communication terminal apparatus 100.

Figure 3:
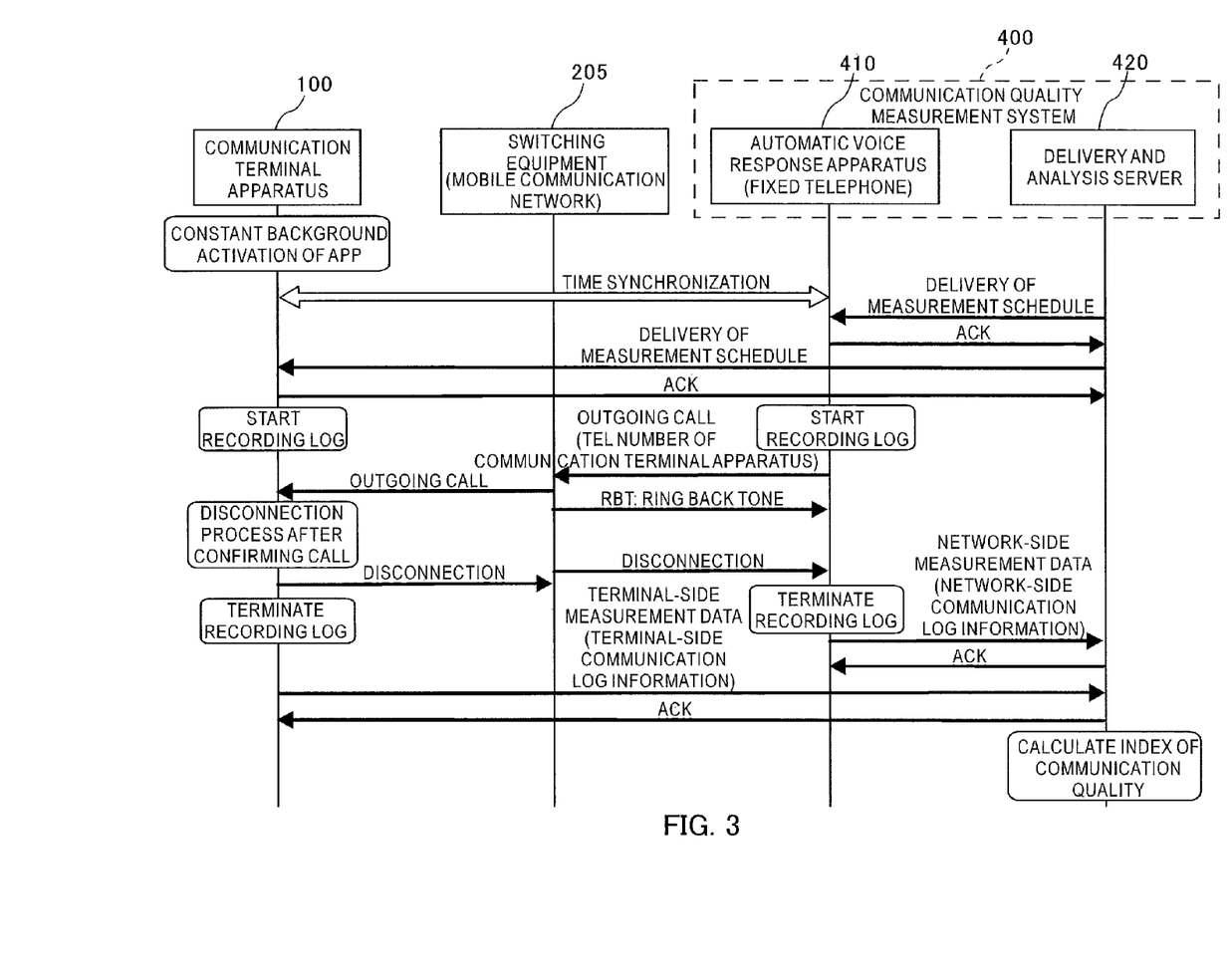
FIG. 3 is a sequence diagram showing one example of communication quality measurements for a voice communication in the direction of incoming to a communication terminal apparatus in the communication system according to the present embodiment.

FIG. 3 is a sequence diagram showing one example of communication quality measurements for a voice communication in the direction of incoming to the communication terminal apparatus 100 in the communication system according to the present embodiment. In the present example, a description of the same or substantially the same part as that of the aforementioned example in FIG. 2 will be omitted.

In FIG. 3, after the measurement schedule is delivered and the communication terminal apparatus 100 and the automatic voice response apparatus 410 start recording a communication log of communication quality measurement, when the foregoing predetermined measurement time (10:00 on Nov. 11, 2014) comes, the automatic voice response apparatus 410 starts recording a communication log for measuring a predetermined communication quality and performs an automatic outgoing call, via the mobile communication network 200 and the fixed-telephone network 300, to the telephone number (080********) of communication terminal apparatus 100 designated as a destination on the foregoing measurement schedule.

When it comes to the timing reached near the measurement time (10:00 on Nov. 11, 2014) designated with the measurement schedule received from the delivery and analysis server 420, the communication terminal apparatus 100 starts recording a communication log for measuring a predetermined communication quality.

When receiving a disconnection signal from the communication terminal apparatus 100 via the switching equipment 205, the automatic voice response apparatus 410 terminates recording the communication log. The network-side measurement data including the terminal-existing base-station quality information recorded with the automatic voice response apparatus 410 is transmitted to the delivery and analysis server 420. The disconnecting process of voice communication may be performed with the automatic voice response apparatus 410, separating from the communication terminal apparatus 100.

On the other hand, when receiving the outgoing call from the switching equipment 205, the communication terminal apparatus 100 performs an automatic disconnecting process after confirming the incoming call, transmits a disconnection signal to the automatic voice response apparatus 410 via the switching equipment 205, and then, terminates recording the communication log. The terminal-side measurement data including the terminal-status log information recoded with the communication terminal apparatus 100 is transmitted to the delivery and analysis server 420.

As described above, according to the example in FIG. 3, the measurement schedule is delivered from the delivery and analysis server 420 to the communication terminal apparatus 100 and the automatic voice response apparatus 410, as the measurement condition of communication quality measurement for a voice communication received by the communication terminal apparatus 100. Consequently, with respect to the voice communication received by the communication terminal apparatus 100, the measurement schedule of communication quality measurement can be set or changed easily and optionally, and then, as is the case of example shown in FIG. 2, while various communication quality measurements can be performed flexibly, the communication quality can be measured with high accuracy.

Figure 4:
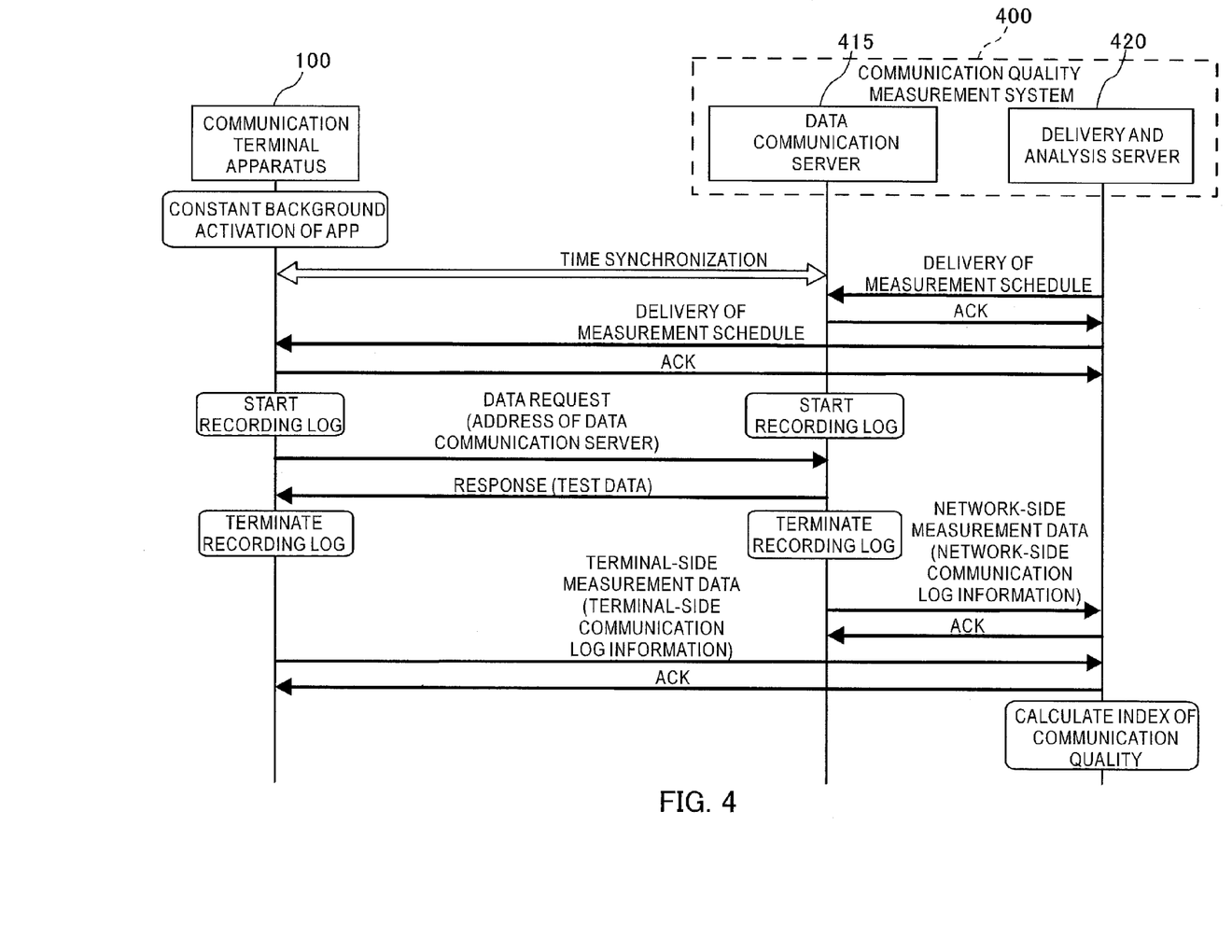
FIG. 4 is a sequence diagram showing one example of communication quality measurements for a data communication in downlink from a data communication server to a communication terminal apparatus in the communication system according to the present embodiment.

FIG. 4 is a sequence diagram showing one example of communication quality measurements for a data communication in downlink from the data communication server 415 to the communication terminal apparatus 100 in the communication system according to the present embodiment. In the present example, a description of the same or substantially the same part as that of the aforementioned example in FIG. 2 will be omitted.

In FIG. 4, to begin with, the delivery and analysis server 420 transmits information of a predetermined measurement schedule to the communication terminal apparatus 100 and the data communication server 415, as the measurement condition defining a timing of communication quality measurement. In the information of measurement schedule, respective addresses of an origination and a destination in a IP network established in the mobile communication network 200 are written as information of the origination and destination, instead of a telephone number.

When it comes to the timing reached near the designated measurement time (10:00 on Nov. 11, 2014), the communication terminal apparatus 100 starts recording a communication log for communication quality measurements based on the information of measurement schedule received from the delivery and analysis server 420.

Furthermore, when it comes to the timing reached near the measurement time (10:00 on Nov. 11, 2014) designated with on the measurement schedule received from the delivery and analysis server 420, the data communication server 415 starts recording a communication log for communication quality measurements. In the data communication server 415, the recording of communication log for communication quality measurements may be constantly performed.

When the foregoing predetermined measurement time (10:00 on Nov. 11, 2014) comes, the communication terminal apparatus 100 performs an automatic uplink communication of transmitting a data request to the address of data communication server 415 designated as the destination by the foregoing measurement schedule, via the mobile communication network 200. The address of data communication server 415 may be set in the communication quality measurement app in advance.

When receiving the data request from the communication terminal apparatus 100, the data communication server 415 transmits a response including the requested test data to the communication terminal apparatus 100 via the mobile communication network 200.

When receiving the response including the test data from the data communication server 415, the communication terminal apparatus 100 terminates recording the communication log. The terminal-side measurement data including the terminal-status log information recorded in the communication terminal apparatus 100 is transmitted to the delivery and analysis server 420.

On the other hand, after transmitting the response including the test data to the communication terminal apparatus 100, the data communication server 415 terminates recording the communication log. The network-side measurement data including the terminal-existing base-station quality information recorded in the data communication server 415 is transmitted to the delivery and analysis server 420.

In the terminal-side measurement data and network-side measurement data of the present example, respective addresses of an origination and a destination in a IP network established in the mobile communication network 200 are written as information of the origination and destination, instead of a telephone number.

When receiving the terminal-side measurement data from the communication terminal apparatus 100 and the network-side measurement data from the data communication server 415, the delivery and analysis server 420 performs a process of communication quality analysis. In this communication quality analysis, for example, the terminal-side measurement data and the network-side measurement data having a mutually equal schedule ID (schedule management number) are collated, and an index of communication quality in the uplink data communication of requesting data from the communication terminal apparatus is calculated. The index value of communication quality calculated herein is, for example, at least one of a probability of connection, a (total) probability of failed connection, a failure probability of connection (caused by network-side), a probability of out-of-service, a probability of airplane mode, a probability of apparatus failures, a probability of power-off, a value indicating presence or absence of forcible disconnection (Call Drop), a voice quality value (MOS value) indicating evaluation result of voice quality and an error rate during communication (block error rate, bit error rate, packet loss rate, etc.) for data communication, which are exemplified in the foregoing Table 6.

As described above, according to the example in FIG. 4, the measurement schedule is delivered from the delivery and analysis server 420 to the communication terminal apparatus 100 and the data communication server 415, as the measurement condition of communication quality measurement for a data communication in downlink from the data communication server 415 to the communication terminal apparatus 100. Consequently, with respect to the data communication in downlink from the data communication server 415 to the communication terminal apparatus 100, the measurement schedule of communication quality measurements can be set or changed easily and optionally, and then, as is the case of example shown in FIGS. 2 and 3, while various communication quality measurements can be performed flexibly, the communication quality can be measured with high accuracy.

Furthermore, according to the example in FIG. 4, it is enough for the communication terminal apparatus 100 to perform a process of recording communication log information during performing a communication for measuring communication quality in accordance with the measurement schedule received from the delivery and analysis server 420. Consequently, load of processing in the communication terminal apparatus 100 can be suppressed compared to a case of constantly recording communication log information in the communication terminal apparatus 100.

Figure 5:
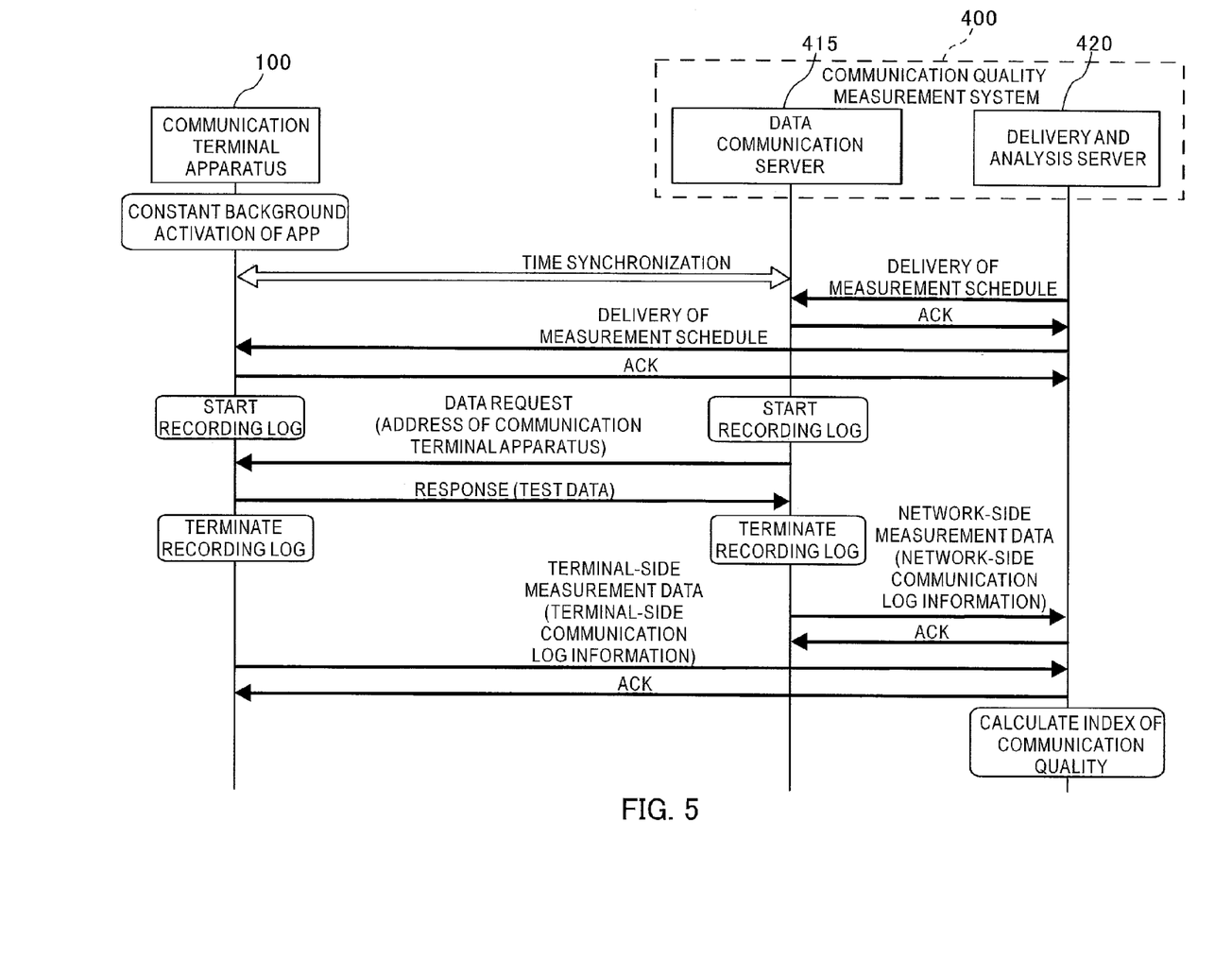
FIG. 5 is a sequence diagram showing one example of communication quality measurements for a data communication in uplink from a communication terminal apparatus to a data communication server in the communication system according to the present embodiment.

FIG. 5 is a sequence diagram showing one example of communication quality measurements for a data communication in uplink from the communication terminal apparatus 100 to the data communication server 415 in the communication system according to the present embodiment. In the present example, a description of the same or substantially the same part as that of the aforementioned examples in FIGS. 2 to 4 will be omitted.

In FIG. 5, after a measurement schedule is delivered and recordings of communication logs for communication quality measurements in the communication terminal apparatus 100 and the data communication server 415 are started, when the foregoing predetermined measurement time (10:00 on Nov. 11, 2014) comes, the data communication server 415 performs an automatic uplink communication of transmitting a data request to the address of communication terminal apparatus 100 designated as the destination by the foregoing measurement schedule, via the mobile communication network 200.

When receiving the data request from the data communication server 415, the communication terminal apparatus 100 transmits a response including the requested test data to the data communication server 415 via the mobile communication network 200.

When receiving the response including the test data from the communication terminal apparatus 100, the data communication server 415 terminates recording the communication log. The network-side measurement data including the terminal-existing base-station quality information recorded in the data communication server 415 is transmitted to the delivery and analysis server 420.

On the other hand, after performing the process of transmitting the response including the test data to the data communication server 415, the communication terminal apparatus 100 terminates recording the communication log. The terminal-side measurement data including of the terminal-status log information recorded in the communication terminal apparatus 100 is transmitted to the delivery and analysis server 420.

As described above, according to the example in FIG. 5, the measurement schedule is delivered from the delivery and analysis server 420 to the communication terminal apparatus 100 and the data communication server 415, as the measurement condition of communication quality measurement for a data communication in uplink from the communication terminal apparatus 100 to the data communication server 415. Consequently, with respect to the data communication in uplink from the communication terminal apparatus 100 to the data communication server 415, the measurement schedule of communication quality measurements can be set or changed easily and optionally, and then, as is the case of example shown in FIGS. 2 to 4, while various communication quality measurements can be performed flexibly, the communication quality can be measured with high accuracy.

It is noted that, although the index of communication quality is calculated by using both of the terminal-side measurement data and the network-side measurement data in the aforementioned embodiments, the index of communication quality may be calculated by using either one of the terminal-side measurement data and the network-side measurement data.

Furthermore, although it is described with respect to the case that the measurement condition delivered from the delivery and analysis server 420 designates the measurement time in the aforementioned embodiments, any measurement condition other than the foregoing measurement schedule may be delivered if the measurement condition can define a timing for performing the communication quality measurement. For example, a certain condition designating a location (for example, area name, cell ID, etc.) where the communication terminal apparatus 100 performing the communication quality measurement locates.

Moreover, in the aforementioned embodiments, the foregoing measurement schedule may be changed based on at least one of terminal identification information of the communication terminal apparatus 100 (for example, telephone number), a communication history of the communication terminal apparatus 100, a type/model of the communication terminal apparatus 100, a current location (GPS position, area, existing cell, etc.) of the communication terminal apparatus 100, a time zone (weekday/holiday, day of week, early morning/daytime/nighttime), a moving speed (for example, resting, low speed during moving on foot and or the like, high speed during moving by car, train or the like) of the communication terminal apparatus 100, information on a communications service provider of the mobile communication network 200, and a communication quality (for example, receiving SINR) in the communication terminal apparatus 100.

For example, when it is determined that the communication terminal apparatus 100 locates in an event site of a festival, a display of fireworks, etc. where many communication terminal apparatuses exist around there with high probability, based on the information of current location of the communication terminal apparatus 100, the foregoing measurement schedule may be changed so as to cancel the communication quality measurement or restrict the number of the communication quality measurements in the time zone during the course of the event. In the case that the moving speed of communication terminal apparatus 100 is high speed that is higher than a predetermined threshold such as the case of moving by a train or the like, the foregoing measurement schedule may be changed so as to cancel the communication quality measurement. In the case that the communication terminal apparatus 100 is in the resting state, the foregoing measurement schedule may be changed so as to restrict the number of the communication quality measurements.

Further, the present system may be configured so as to have an automatic learning function of sequentially learning and updating the foregoing measurement schedule for each of the communication terminal apparatus 100, and the measurement time of communication quality measurement recently performed may be preferentially set as a measurement time for next communication quality measurement.

By setting and changing the foregoing measurement schedule, for example, communication quality measurements for the mobile communication network 200 in a specific time zone and/or a specific place can be performed, and/or the communication quality measurements can be performed with respect to a specific type/model of communication terminal apparatus.

Furthermore, with respect to the foregoing measurement schedule, a measurement time may be randomly set.

Moreover, the communication terminal apparatus 100 and network-side apparatuses may record and create the communication log and perform the communication quality measurements, in accordance with a similar policy (rule) of measurement schedule. For example, a time (start time of measurement) of starting a communication quality measurement may be determined, the communication log may be recorded and created and the communication quality measurement may be performed, based on a measurement schedule for repeating the communication quality measurement at regular time intervals (for example 1 hour) from the start time of measurement.

It is noted that process steps and configuration elements in each of the communication terminal apparatus 100, the automatic voice response apparatus 410, the data communication server 415, the delivery and analysis server 420, etc. described in the present specification can be implemented with various means as well as the aforementioned means. For example, these process steps and configuration elements may be implemented with hardware, firmware, software, or a combination thereof.

With respect to hardware implementation, means such as processing units or the like used for establishing the foregoing steps and configuration elements in entities (for example, various wireless communication apparatuses, Node B, server, gateway, switching equipment, computer, hard disk drive apparatus, or optical disk drive apparatus) may be implemented in one or more of an application-specific IC (ASIC), a digital signal processor (DSP), a digital signal processing device (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for establishing the foregoing configuration elements may be implemented with a program (for example, a code such as a procedure, a function, a module, an instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may be executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST 100 communication terminal apparatus
200 mobile communication network
210 base station
300 fixed-telephone network
400 communication quality measurement system
410 automatic voice response apparatus
415 data communication server
420 delivery and analysis server
500 Internet
510 access-point apparatus
600 contents providing server
610 NTP server

The invention claimed is:

1. A method of measuring communication quality, comprising:
    delivering information on measurement condition including information on a measurement schedule designating a measurement time of measuring communication quality and measurement-schedule identification information of identifying the measurement schedule, to a communication terminal apparatus capable of communicating via a mobile communication network;
    performing a communication with the communication terminal apparatus via the mobile communication network at a timing when the measurement time designated by the measurement schedule of the measurement condition occurs;
    acquiring terminal-side measurement data recorded in the communication terminal apparatus side with respect to two or more communications performed at the timing when the measurement time designated by the measurement schedule occurs and network-side measurement data recorded in the network side with respect to the communications performed at the timing when the measurement time designated by the measurement schedule occurs, wherein the terminal-side measurement data includes information on success or failure of connection, the measurement-schedule identification information, terminal-status log information and terminal-existing base-station quality information, and the network-side measurement data includes the information on success or failure of connection and the measurement-schedule identification information;
    calculating an index value of communication quality including a probability of successful connection in the communications via the mobile communication network based on both the terminal-side measurement data and the network-side measurement data; and
    identifying a cause of communication failure by collating the terminal-status log information with the terminal-existing base-station quality information, in case that the communication performed at the timing when the measurement time designated by the measurement schedule occurs is failed.

2. The method according to claim 1, wherein the index value of communication quality is calculated with respect to bidirectional communications of an outgoing call from the communication terminal apparatus and an incoming call to the communication terminal apparatus.

3. The method according to claim 1, wherein
    the delivery of measurement condition, the communication via the mobile communication network, and the acquisition of at least one of the terminal-side measurement data and the network-side measurement data are performed for a plurality of communication terminal apparatuses; and
    the index value of communication quality is calculated with respect to communications with the plurality of communication terminal apparatuses via the mobile communication network.

4. The method according to claim 1, wherein the measurement condition of communication quality includes at least one kind of information on a measurement schedule designating time of measuring the communication quality, a measurement area designating place at which the communication terminal apparatus locates upon measuring the communication quality and a moving speed in measurement designating a moving speed of the communication terminal apparatus upon measuring the communication quality.

5. The method according to claim 1, wherein the information to be delivered includes a measurement contents designating a type of the index value of communication quality to be measured.

6. The method according to claim 1, wherein the index value of communication quality includes a probability of successful connection and at least one of: a probability of failed connection, a probability of out-of-service, a probability of airplane mode, a probability of apparatus failures, a probability of power-off, a presence or absence of forcible disconnection, an evaluation value of voice quality and an error rate of communication terminal apparatuses in the mobile communication network.

7. The method according to claim 1, wherein the communication for measuring the communication quality is a voice communication via the mobile communication network.

8. The method according to claim 1, wherein the communication for measuring the communication quality is a data communication via the mobile communication network.

9. The method according to claim 1, wherein a server acquires at least one of the terminal-side measurement data and the network-side measurement data and calculates an index value of communication quality in communication via the mobile communication network based on at least one of the terminal-side measurement data and the network-side measurement data.

10. A system of measuring communication quality, comprising:
    a memory containing software;
    a processor, coupled to the memory, that executes the software that contains:
    means for delivering information on measurement condition including information on a measurement schedule designating a measurement time of measuring communication quality and measurement-schedule identification information of identifying the measurement schedule, to a communication terminal apparatus capable of communicating via a mobile communication network;

means for performing a communication with the communication terminal apparatus via the mobile communication network at a timing when the measurement time designated by the measurement schedule of the measurement condition occurs;

means for acquiring terminal-side measurement data recorded in the communication terminal apparatus side with respect to two or more communications performed at the timing when the measurement time designated by the measurement schedule occurs and network-side measurement data recorded in the network side with respect to the communications performed at the timing when the measurement time designated by the measurement schedule occurs, wherein the terminal-side measurement data includes information on success or failure of connection, the measurement-schedule identification information, terminal-status log information and terminal-existing base-station quality information, and the network-side measurement data includes the information on success or failure of connection and the measurement-schedule identification information;

means for calculating an index value of communication quality including a probability of successful connection in the communications via the mobile communication network based on both the terminal-side measurement data and the network-side measurement data; and identifying a cause of communication failure by collating the terminal-status log information with the terminal-existing base-station quality information, in case that the communication performed at the timing when the measurement time designated by the measurement schedule occurs is failed.

11. The system according to claim 10, wherein the index value of communication quality is calculated with respect to bidirectional communications of an outgoing call from the communication terminal apparatus and an incoming call to the communication terminal apparatus.

12. The system according to claim 10, wherein the delivery of measurement condition, the communication via the mobile communication network, and the acquisition of at least one of the terminal-side measurement data and the network-side measurement data are performed for a plurality of communication terminal apparatuses; and wherein the index value of communication quality is calculated with respect to communications with the plurality of communication terminal apparatuses via the mobile communication network.

13. The system according to claim 10, wherein the measurement condition of communication quality includes at least one kind of information on a measurement schedule designating time of measuring the communication quality, a measurement area designating place at which the communication terminal apparatus locates upon measuring the communication quality and a moving speed in measurement designating a moving speed of the communication terminal apparatus upon measuring the communication quality.

14. The system according to claim 10, wherein the information to be delivered includes a measurement contents designating a type of the index value of communication quality to be measured.

15. The system according to claim 10, wherein the index value of communication quality includes a probability of successful connection and at least one of: a probability of failed connection, a probability of out-of-service, a probability of airplane mode, a probability of apparatus failures, a probability of power-off, a presence or absence of forcible disconnection, an evaluation value of voice quality and an error rate of communication terminal apparatuses in the mobile communication network.

16. The system according to claim 10, wherein the communication for measuring the communication quality is a voice communication via the mobile communication network.

17. The system according to claim 10, wherein the communication for measuring the communication quality is a data communication via the mobile communication network.

18. The system according to claim 10, further comprising:

a server of delivering information including the measurement condition to a communication terminal apparatus capable of communicating via a mobile communication network; and a network-side apparatus of performing a communication with the communication terminal apparatus via the mobile communication network at a predetermined timing that satisfies the measurement condition are provided, and wherein the server acquires at least one of the terminal-side measurement data and the network-side measurement data and calculates an index value of communication quality in communication via the mobile communication network based on at least one of the terminal-side measurement data and the network-side measurement data.

\* \* \* \* \*